United States Patent [19]

Patel

[11] 4,107,559
[45] Aug. 15, 1978

[54] MINIATURE MOTOR

[75] Inventor: Jayant K. Patel, Englewood, Ohio

[73] Assignee: TRW Inc., Cleveland, Ohio

[21] Appl. No.: 741,545

[22] Filed: Nov. 15, 1976

[51] Int. Cl.$^2$ ............................................. H02K 37/00
[52] U.S. Cl. ........................... 310/49 R; 310/40 MM;
310/90; 310/194
[58] Field of Search .................. 310/40 MM, 194, 49,
310/90, 43, 156, 114, 254, 258, 162–165, 259;
308/238, 239, 161, 141, DIG. 8, DIG. 9;
403/14

[56] References Cited

U.S. PATENT DOCUMENTS

| Re. 28,075 | 7/1974 | Kavanaugh | 310/156 |
|---|---|---|---|
| 3,397,531 | 8/1968 | Dubois | 308/238 |
| 3,415,155 | 12/1968 | Riddell | 308/238 |
| 3,448,306 | 6/1969 | Murray | 310/164 UX |
| 3,495,113 | 2/1970 | Haydon | 310/164 |
| 3,633,055 | 1/1972 | Maier | 310/162 |
| 3,671,841 | 6/1972 | Hoffmann | 310/49 |
| 3,693,034 | 9/1972 | Inariba | 310/49 |
| 3,936,680 | 2/1976 | Kuwako | 310/40 MM |
| 3,966,276 | 6/1976 | Belarbre | 308/238 |
| 3,986,751 | 10/1976 | Diederich | 308/238 |

FOREIGN PATENT DOCUMENTS 993,937  7/1976  Canada ..................... 310/90

OTHER PUBLICATIONS

IBM Techn. Disclosure Bulletin; vol. 11, No. 3; 8/68; p. 259.

*Primary Examiner*—R. Skudy
*Attorney, Agent, or Firm*—Biebel, French & Nauman

[57] ABSTRACT

A miniature two-phase stepping motor includes sheet metal punched or stamped pole pieces and electrical coil assemblies having injection molded coil forms. The coil forms are provided with alignment bosses or protuberances which extend through pilot openings formed in the sheet metal poles to assure and maintain accurate alignment of the poles and the motor sections. The motor bearings are similarly supported and piloted on alignment pins formed on the coil forms.

3 Claims, 5 Drawing Figures 4,107,559

MINIATURE MOTOR

BACKGROUND OF THE INVENTION

This invention relates to precision motors and more particularly to small or miniature-type motors, including stepping motors and the like.

There exists a need for miniature motors which can be produced at low cost, and which inherently maintain a high degree of precision in the location and alignment of the rotating and non-rotating parts. One important aspect in maintaining precision in mass produced motors is that of tolerance in the manufacture of the parts. On the one hand, low cost motors frequently use metal stampings for the magnetic poles, as shown for example in the United States patents of Kavanaugh, U.S. Pat. No. Re. 28,075 issued July 16, 1974, Van Lieshout et al, U.S. Pat. No. 2,981,855 issued Apr. 25, 1961 and Riggs, U.S. Pat. No. 3,014,141 issued Dec. 19, 1961. However, in such conventional constructions, the bearings for supporting the motor shaft and armature are, themselves, supported on end frames or pole members. Accordingly, the bearing-receiving openings in such end frames or pole members must be accurately formed, and their positions maintained in assembly.

It is also known to cement bearing housings directly to a bobbin in the manufacture of watch motors to achieve accurate alignment of the motor shafts, as shown in da Costa et al, U.S. Pat. No. 3,803,430 issued Apr. 9, 1974. In da Costa, no metal individual pole pieces are used.

SUMMARY OF THE INVENTION

The present invention is directed to miniature precision motors in which the inherent accuracy of plastic injected parts is utilized for the maintenance of the critical alignment of rotary and non-rotary components, and in which an annular plastic-injected coil form provides the means by which the end bearings as well as the magnetic poles are maintained in critical alignment.

More particularly, the invention is directed to a miniature precision motor in which a plastic bobbin-type coil form is positioned between a pair of pole members, which may be formed of sheet material, and in which a shaft-supporting bearing is piloted on the bobbin form. In addition, the pole members are also piloted and supported in predetermined alignment and position on the bobbin coil form.

In a preferred embodiment of the invention, a two-phase or two-stator stepping motor includes a pair of bobbin coils positioned in axial alignment. Piloting members cooperate to define not only the position of the poles but also angular alignment of the motor phase sections.

It is accordingly an important object of this invention to provide a motor in which the motor bearings are piloted and supported on an annular bobbin or spool.

It is another object of this invention to provide a miniature motor in which the bearings and the pole pieces are maintained in prealigned positions with respect to a plastic bobbin.

A further object of the invention is the provision of a stepping motor constructed according to the principles outlined above.

These and other objects and advantages of the invention will be apparent from the following description, the accompanying drawings and the appended claims.

DESCRIPTION OF THE PREFERRED EMBODIMENT

Figure 1:
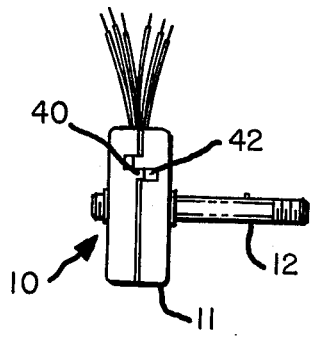
FIG. 1 is a side elevation of a motor according to this invention.
Figure 2:
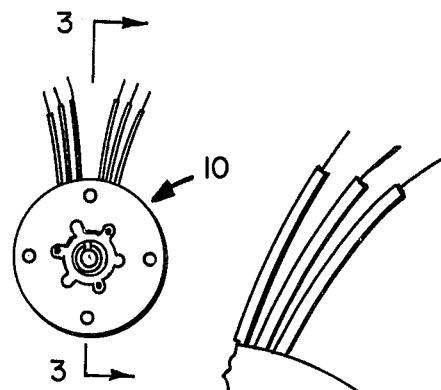
FIG. 2 is an end elevation thereof.

The two-stator or two-phase type of direct current miniature stepping motor is illustrated generally at 10 in FIGS. 1 and 2. In the preferred embodiment, the motor 10 comprises an incremental linear actuator for driving a threaded non-rotating actuator shaft 12, although it will be obvious to those skilled in the art that other forms of useful work may be accomplished by the motor of this invention.

Figure 4:
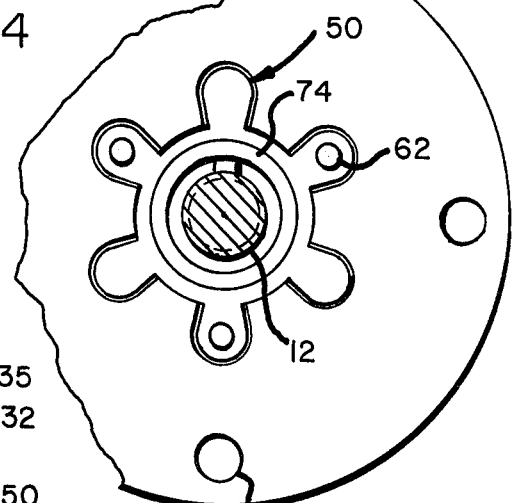
FIG. 4 is a fragmentary end view looking generally along the line 4—4 of FIG. 3.
Figure 3:
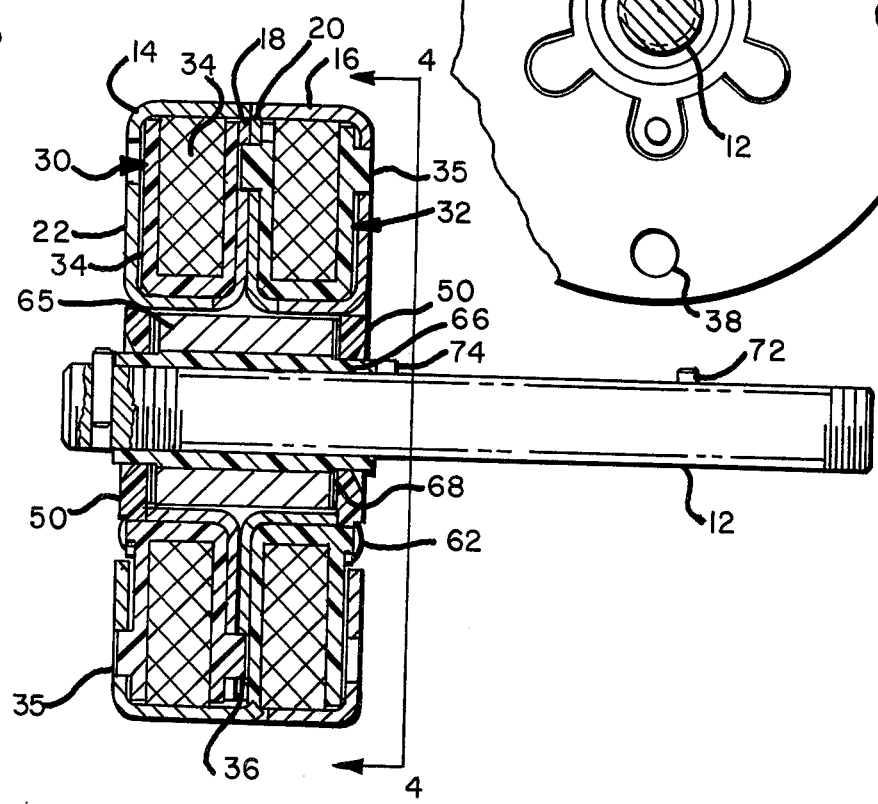
FIG. 3 is a transverse enlarged sectional view taken generally along the line 3—3 of FIG. 1.

Referring to FIGS. 3 and 4, an outer motor shell or housing 11 is made up essentially of sheet metal parts, including a pair of essentially identical outer pole pieces 14 and 16 and a pair of inner pole pieces 18 and 20. The pole pieces 14 and 18 are associated with one phase of the stepping motor 10 while the pole pieces 16 and 20 are associated with the axially-adjacent stepping motor phase. The poles may be formed by a metal stamping operation.

Figure 5:
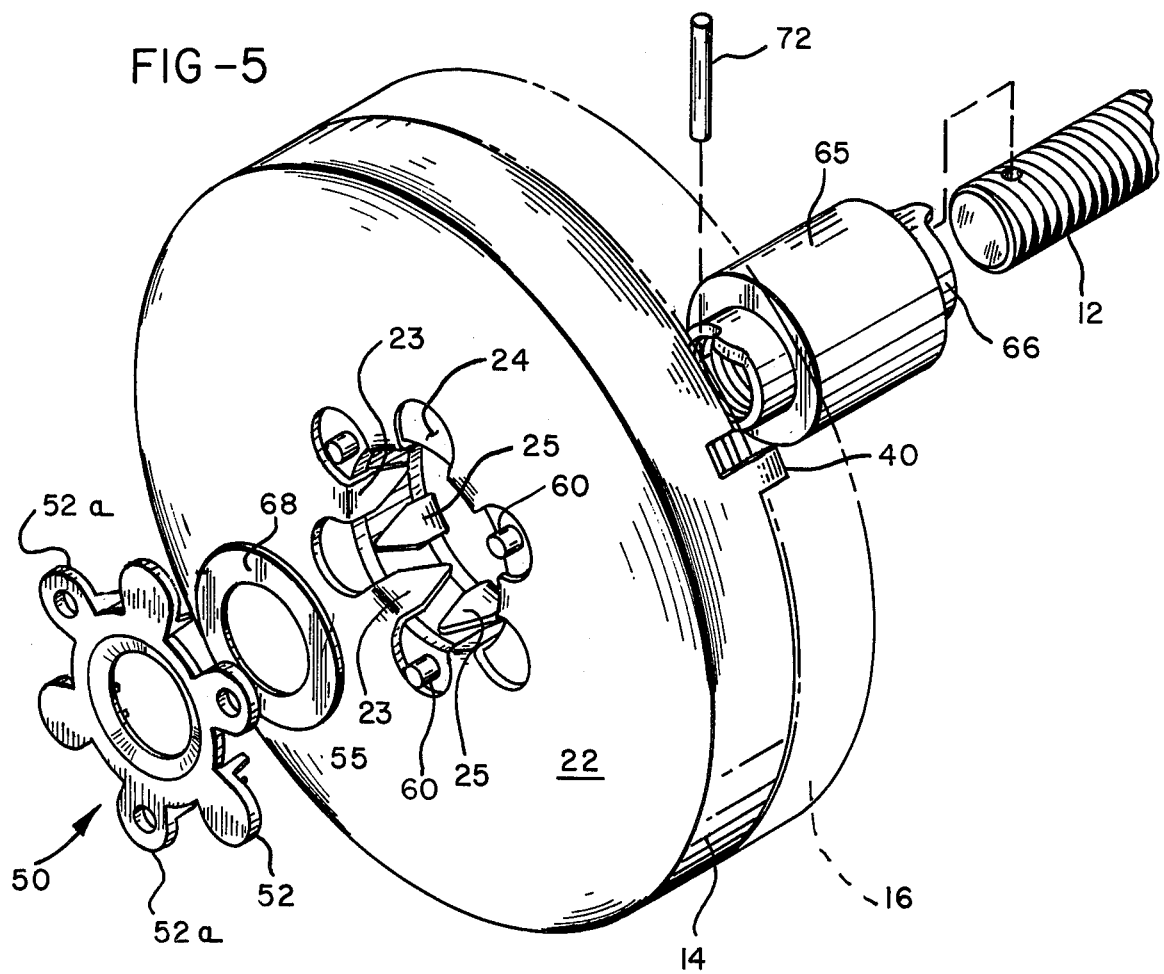
FIG. 5 is an exploded view showing details of the assembly of the motor.

The pole piece 14 may be considered as a first outer sheet metal pole which has a radial portion 22 forming one end wall of the motor 10. The pole piece 14 is formed with a plurality of inwardly-turned, axially-aligned tapered poles 23 as shown in FIG. 5, arranged in an accurately spaced arrangement. As shown, each section of the motor has twelve poles with six poles being formed by each cooperating pole piece. Also, as shown in FIG. 5, semi-circular stress-relieving cutouts 24 are formed in the radial portion arcuately between the individual poles 23.

The non-rotating inner pole pieces 18 and 20 are shown in FIG. 3 as being positioned in generally back-to-back relation to each other. Each is formed with a radial wall portion and an annular array of axially extending outwardly turned poles 25 (FIG. 5). The poles 25 are arranged in interfitting staggered relation to the poles 23.

Each section of the stepping motor includes an identical electrical coil or spool assembly which includes a plastic injection-molded coil form 30 or 32, and an electrical coil 34 wound thereon. The coil form 30 is located between the pole pieces 14 and 18 while the coil form 32 is located between the pole pieces 16 and 20. Each of the coil forms 30, 32 is formed with a pair of axially extending protuberances 35 and 36. The protuberances 35 extend axially through pilot openings 38 (FIG. 4) formed in the radial wall portions 22 of the ends walls of the motor, and thus define means on the coil forms for locking the corresponding pole pieces in a fixed angular location to the coils. Similarly, the protuberances 36 extend inwardly and are proportioned or dimensioned to extend through aligned openings formed in the abutting radial portions of the inner pole pieces 18 and 20. In effect, the protuberances 36 define pilot means on the bobbin coil forms which interlock the two stepping motor sections in precise angular relation and maintain the alignment of the respective inner pole pieces to the motor sections.

As seen in FIGS. 1 and 5, the outer axial portions of the end pole pieces are provided with tabs 40, which when assembled on the respective coil forms 30, 32 are received in cutout portions 42 formed on the adjacent pole piece. These tabs 40 are bent or deflected inwardly to engage the circumference of the inner poles, as shown in the sectional view in FIG. 3, thereby locking the motor sections together as a unitary structure.

The motor of this invention further comprises means for piloting and supporting the motor bearings directly on a side wall of the coil forms 30 and 32. For this purpose, a pair of identical generally spider-shaped plastic bearings 50 are employed, as best shown in FIG. 5. These may be formed of suitable low-friction material and have a plurality of radially outwardly extending fingers 52 and 52a. Two or more of the fingers are provided with pilot openings 55 as shown in FIG. 5 as being associated with the fingers 52a. The fingers 52 and 52a are proportioned to be received within the relief openings 24 formed on the radial end walls of the pole pieces 14 and 16. The openings 55 receive plastic pins 60 formed on the side walls of the respective coil forms 30 and 32. Thus, the bearings 50 are piloted on the pins 60 and the axial aligned position of the bearings is defined not in relation to the motor poles, but rather in relation to the coil form itself. The ends 62 of the pin 60 (FIG. 3) may be flattened or headed such as by pressing with a heated iron to retain the bearings in place.

The motor of the preferred embodiment is illustrated as a twelve-pole stepping motor in which the two electrical sections may be offset 90 angular degrees, as is well known in the stepping motor art. The coils 34 may be selectively energized by direct current. A multiple pole permanent magnet armature 65 is mounted on a hollow plastic shaft 66. The shaft 66 is proportioned to run within the openings formed in the bearings 50. One or more shim washers 68 may be employed at either end of the armature 65 to take up end play. As shown, the motor shaft 66 is internally threaded to receive the threaded actuator shaft 12 therein so that rotation of the shaft 66 results in corresponding axial displacement of the shaft 12. Radial stop pins 72 may be provided on the shaft 12 to engage with stop abutment surfaces 74 formed at the axial ends of the hollow motor shaft 66 to provide a positive stop engagement at defined axial travel limits of the actuator shaft 12.

Although the preferred embodiment of this invention has been described in terms of a two-phase stepping motor it will be obvious to those skilled in the art that the structure of the invention may be applied generally to miniature motors where it is desired to provide a low cost and yet a highly accurate and precision interfitting of the parts. The tolerance of injected molded parts can be accurately maintained over a large number of such parts. By piloting and locating the magnetic pole members and the bearings in relation to the coil form, an accurately aligned armature opening may readily be assured in relation to the poles. Additionally, particular advantage is realized in a stepping motor construction where the motor sections themselves are interlocked and maintained in precise alignment by reason of the interfitting protuberances 36 extending from the coil forms through alignment openings formed in the inner pole members.

While the form of apparatus herein described constitutes a preferred embodiment of this invention, it is to be understood that the invention is not limited to this precise form of apparatus, and that changes may be made therein without departing from the scope of the invention.

What is claimed is:

1. A miniature two-phase stepping motor comprising a pair of inner pole pieces having radial portions positioned in generally back-to-back relation and each having an annular array of axially extending outwardly turned poles, a first outer pole piece having a radial portion forming one end wall of the motor and having an annular array of inwardly turned axial poles spaced between the corresponding poles of one of said inner pole pieces, a second outer pole piece having a radial portion forming an opposite wall of said motor and having an annular array of inwardly turned axial poles spaced between the poles of the other of said inner pole pieces, a first plastic bobbin coil form received between said one inner pole piece and said first pole piece forming a first stepping motor phase, a second plastic bobbin coil form positioned between said second pole piece and said other inner pole piece defining a second stepping motor phase, integral axially extending protuberances on said coil forms, means in said pole pieces defining apertures receiving said protuberances therein for interlocking said pole pieces in fixed angular relation with respect to said coil forms, axially spaced bearing means directly supported on a different one of said bobbin coil forms adjacent said outer walls, a shaft rotatably received in said bearing means, and an armature mounted on said shaft in magnetic coupled relation to said poles.

2. In a miniature precision motor, the improvement comprising a first sheet metal pole member having a generally radial wall and formed with integral inwardly turned axially aligned poles, a second sheet metal pole member having a generally radial wall axially spaced from the wall of said first member and also having inwardly turned axially aligned poles positioned in interfitting relation with the poles on said first member, a bobbin coil form positioned between said member walls and piloted on said members, a spider-shaped plastic bearing having a plurality of radially extending arms, means piloting said arms directly on a side wall of said coil form and having means defining a central opening, a plastic motor shaft in running engagement with said bearing in said opening, and a permanent magnetic armature on said shaft.

3. A stator for a miniature two-phase stepping motor comprising a pair of sheet metal inner pole pieces having radial portions positioned in generally back-to-back relation and each having an annular array of axially extending outwardly turned poles, a first sheet metal outer pole piece having a radial portion forming one end wall of the motor and having an annular array of inwardly turned axial poles spaced between the corresponding poles of one of said inner pole pieces, a second sheet metal outer pole piece having a radial portion forming an opposite wall of said motor and having an annular array of inwardly turned axial poles spaced between the poles of the other of said inner pole pieces, a first plastic bobbin coil form received between said one inner pole piece and said first pole piece forming a first stepping motor phase, a second plastic bobbin coil form positioned between said second pole piece and said other inner pole piece defining a second stepping motor phase, integral axially extending protuberances on said bobbin coil forms interlocking said pole pieces in fixed angular relation with respect to said coils, and means in said pole pieces defining apertures receiving said protuberances therein.

* * * * *